United States Patent
Cronin et al.

(10) Patent No.: US 6,402,660 B1
(45) Date of Patent: Jun. 11, 2002

(54) APPARATUS AND METHOD FOR ADAPTIVELY SHIFTING BETWEEN RANGES IN A CONTINUOUSLY VARIABLE TRANSMISSION

(75) Inventors: Michael G. Cronin, Peoria; Brian D. Kuras, East Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/669,985

(22) Filed: Sep. 26, 2000

(51) Int. Cl.⁷ .......................... F16H 61/40; F16H 61/38
(52) U.S. Cl. ............................................ 477/68; 477/52
(58) Field of Search ............................... 477/52, 55, 58, 477/68, 69

(56) References Cited

U.S. PATENT DOCUMENTS

| | | | |
|---|---|---|---|
| 3,927,528 A | * 12/1975 | Van der Kolk et al. | 74/859 X |
| 4,187,739 A | * 2/1980 | Hamma et al. | 477/68 X |
| 4,528,813 A | * 7/1985 | Izumi et al. | 60/389 |
| 4,531,431 A | 7/1985 | Dreher et al. | |
| 4,766,779 A | * 8/1988 | Massy | 477/68 |
| 4,939,954 A | * 7/1990 | Walzer et al. | 477/68 X |
| 4,947,687 A | * 8/1990 | Martini et al. | 477/68 X |
| 5,054,599 A | 10/1991 | Marcott | |
| 5,105,922 A | 4/1992 | Yant | |
| 5,199,313 A | 4/1993 | Miller | |
| 5,207,736 A | * 5/1993 | Fredricksen | 477/68 X |
| 5,301,783 A | 4/1994 | Malloy | |
| 5,337,871 A | 8/1994 | Testerman | |
| 5,343,994 A | 9/1994 | Kyrtsos | |
| 5,467,854 A | 11/1995 | Creger et al. | |
| 5,505,100 A | 4/1996 | Mitchell et al. | |
| 5,531,304 A | * 7/1996 | Ishino et al. | 475/76 X |
| 5,551,930 A | 9/1996 | Creger et al. | |
| 5,573,473 A | 11/1996 | Asayama et al. | |
| 5,580,332 A | 12/1996 | Mitchell et al. | |
| 5,682,315 A | * 10/1997 | Coutant et al. | 477/68 X |
| 5,980,411 A | 11/1999 | Wontner | |
| 6,080,074 A | * 6/2000 | Ulbrich et al. | 477/68 X |
| 6,250,180 B1 | * 6/2001 | Legner et al. | 477/68 X |

FOREIGN PATENT DOCUMENTS

JP          401178037   *  7/1989  ................. 477/68

* cited by examiner

Primary Examiner—Rodney H. Bonck
Assistant Examiner—Roger Pang
(74) Attorney, Agent, or Firm—John W. Morrison; Steve M. Hanley

(57) ABSTRACT

A transmission assembly driven by an engine is disclosed. The transmission assembly includes a hydrostatic transmission having a variable displacement hydraulic pump and a hydraulic motor, a mechanical transmission coupled to the hydrostatic transmission for selecting a first gear range and a second gear range, and a controller for receiving operator inputs and generating a displacement command operable to control a displacement of the variable displacement pump. The controller determines the actual displacement. The controller determines a displacement shift level from the actual displacement. The controller executes a shift from the first gear range to the second gear range when the actual displacement reaches displacement shift level. A method of controlling a transmission assembly is also disclosed.

20 Claims, 6 Drawing Sheets

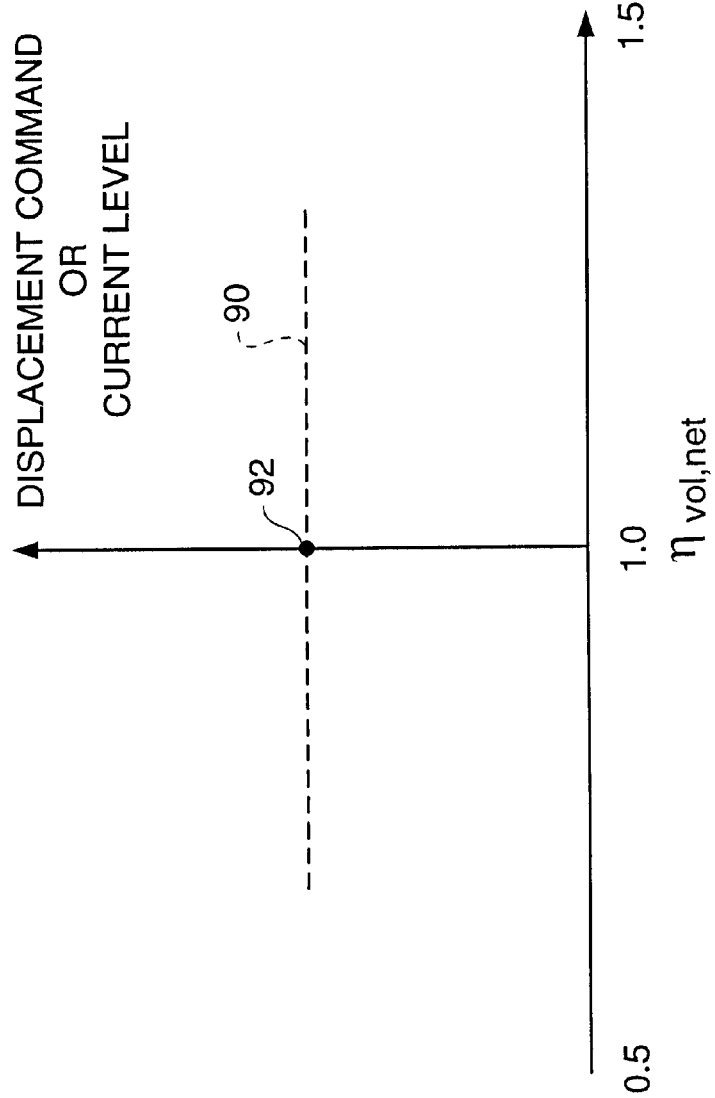

APPARATUS AND METHOD FOR ADAPTIVELY SHIFTING BETWEEN RANGES IN A CONTINUOUSLY VARIABLE TRANSMISSION

Technical Field

The present invention generally relates to a continuously variable transmission, and more specifically to an apparatus and method for adaptively shifting between ranges in a continuously variable transmission.

Background Art

Many work machines, particularly earth working machines, use a continuously variable transmission to drive traction wheels or tracks which propel the work machine. Typically, a hydrostatic transmission, consisting of a variable speed hydraulic pump and a hydraulic motor, provides a continuously variable speed output to the wheels or tracks of the work machine. In particular, the speed output can be continuously varied by controlling the displacement of the hydraulic pump.

In order to operate over a wide range of operating conditions, the engine torque is split between the hydrostatic transmission and a mechanical transmission. The mechanical transmission has a number of transmission ranges corresponding to different operating speeds of the work machine. The combination of the hydrostatic transmission and the mechanical transmission allows a continuously variable transmission to operate over a wider range of speeds than is possible using the hydrostatic transmission alone. Many continuously variable transmissions wait to shift when the relative speed of the oncoming clutch is zero. However, depending on the load, this shift point will feel noncontinuous as the machine will speed up or slow down due to the shift.

In order to shift between ranges a shift point must be determined which provides a smooth continuous output speed, regardless of the load on the transmission. By sensing speed of the hydraulic motor, output speed, and displacement of the variable displacement pump, it is possible to determine the amount of adjustment to the shift point required to achieve a shift which produces a smooth continuously variable output. However, a drawback to determining shift points in this manner is that such calculations are complex and require the reading of several sensors, which may fail during operation of the transmission. Therefore, it is desirable to adaptively determine shift points using a minimum amount of sensed inputs.

What is needed therefore is a method and apparatus for adaptively shifting between ranges in a continuously variable transmission which overcomes the above-mentioned drawbacks.

DISCLOSURE OF THE INVENTION

In accordance with a first aspect of the present invention, there is provided a transmission assembly driven by an engine. The transmission assembly includes a hydrostatic transmission having a variable displacement hydraulic pump and a hydraulic motor, a mechanical transmission coupled to the hydrostatic transmission for selecting a first gear range and a second gear range, and a controller for receiving operator inputs and generating a displacement command operable to control a displacement of the variable displacement pump. The controller determines an actual displacement. The controller determines a displacement shift level from the actual displacement. The controller executes a shift from the first gear range to the second gear range when the actual displacement reaches the displacement shift level.

In accordance with a second aspect of the present invention, there is provided a method of controlling a transmission having a hydrostatic transmission with a variable displacement hydraulic pump and a hydraulic motor, a mechanical transmission coupled to the hydrostatic transmission for selecting a first gear range and a second gear range, and a controller for receiving operator inputs and generating a displacement command operable to control a displacement of the variable displacement pump. The method includes the step of determining the actual displacement. The method further includes the step of determining a displacement shift level from the actual displacement with the controller. The method yet further includes the step of executing a shift from the first gear range to the second gear range when the actual displacement reaches the displacement shift level.

BRIEF DESCRIPTION OF THE DRAWINGS

FIG. 4 is a graph illustrating the relationship between net volumetric efficiency of the hydrostatic transmission and actual displacement for a shift from a first gear to a second gear range.

BEST MODE FOR CARRYING OUT THE INVENTION

Figure 1:
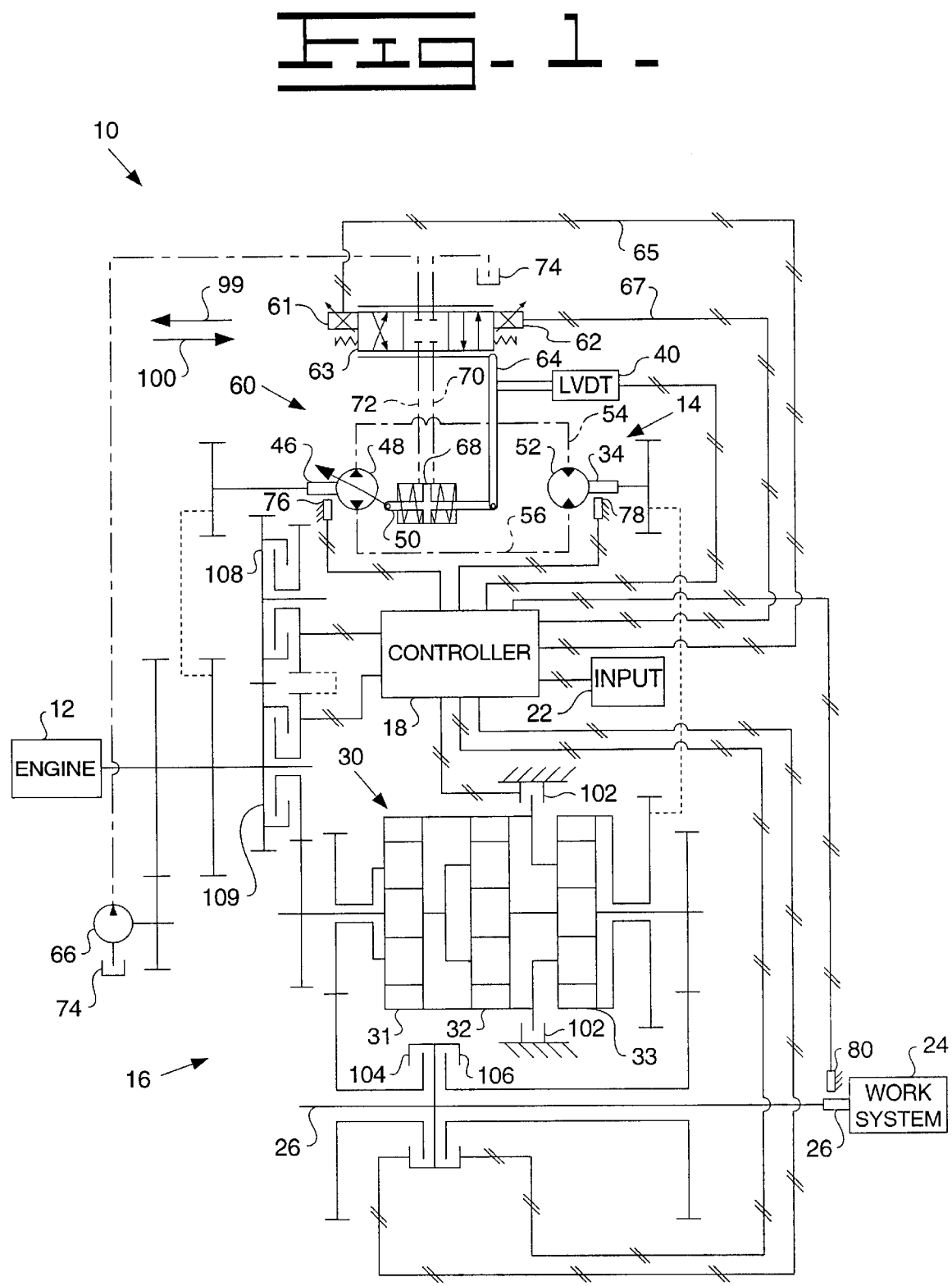
FIG. 1 is a schematic view of a hydro-mechanical, continuously variable transmission which incorporates the features the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a transmission assembly 10 that incorporates the features of the present invention therein. The transmission assembly 10 is adapted for use in a work machine, such as a loader (not shown), having an engine 12. The transmission assembly 10 is of the continuously variable type which includes a continuously variable hydrostatic transmission 14, a mechanical transmission 16, a micro-processor based controller 18, and a command input arrangement 22. A work system 24 is connected to the transmission assembly 10 via a drive shaft 26. The work system 24 is typically the drive wheels or tracks of the work machine.

The hydrostatic transmission 14 is operatively connected to the engine 12 through a pump input drive shaft 46. The hydrostatic transmission 14 includes a variable displacement pump 48 and a motor 52 operatively connected to the variable displacement pump 48 by conduits 54 and 56 to form a hydraulic circuit. A displacement controller 50 sets the displacement of the variable displacement pump 48, and thus, controls the flow of hydraulic fluid between the variable displacement pump 48 and the motor 52. Varying the flow varies the speed of the motor output shaft 34 of the motor 52.

The position of the pump displacement controller 50 is controlled by an electro-hydraulic servo mechanism 60. The servomechanism 60 includes a first solenoid or first actuator 61 and a second solenoid or second actuator 62, a three position four way valve 63, and a feedback arm 64. When an electric current, or a displacement command, is supplied to the first actuator 61 via a signal line 65 the first actuator 61 moves the three position valve 63 in the direction of arrow 100 as to place the valve 63 in a first position. In the first position, the valve 63 causes high pressure fluid from a separate pump 66 to be supplied to a piston member 68 via a line 70 which causes the displacement controller 50 to move in the general direction of arrow 99. Movement of the displacement controller 50 in the general direction of arrow 99 places the variable displacement pump 48 in a positive displacement. Excess fluid exits the displacement controller 50 via a line 72 and is returned to a fluid sump 74. The force of the fluid on the piston member 68 also acts on the position feedback arm 64 in the general direction of arrow 99. An equilibrium is set up between the force exerted by the first actuator 61 in the general direction of arrow 100 and the force exerted by position feedback arm 64 in the general direction of arrow 99. Thus, for positive displacements, the position of the displacement controller 50 is proportional to the current supplied to the first actuator 61 as the displacement command.

When an electric current, or a displacement command, is supplied to the second actuator 62 via a signal line 67, the second actuator 62 moves the three position valve 63 in the direction of arrow 99 so as to place the valve 63 in a second position. In the second position, the valve 63 causes high pressure fluid from the charge pump 66 to be supplied to a piston member 68 via the line 72 which causes the displacement controller 50 to move in the general direction of arrow 100. Movement of the displacement controller 50 in the general direction of arrow 100 places the variable displacement pump 48 in a negative displacement. Excess fluid exits the displacement controller 50 via the line 70 and is returned to a fluid sump 74. The force of the fluid on the piston member 68 also acts on the position feedback arm 64 in the general direction of arrow 100. An equilibrium is set up between the force exerted by the second actuator 62 in the general direction of arrow 99 and the force exerted by position feedback arm 64 in the general direction of arrow 100. Thus, for negative displacements, the position of the displacement controller 50 is proportional to the current supplied to the second actuator 62 as the displacement command.

Figure 2:
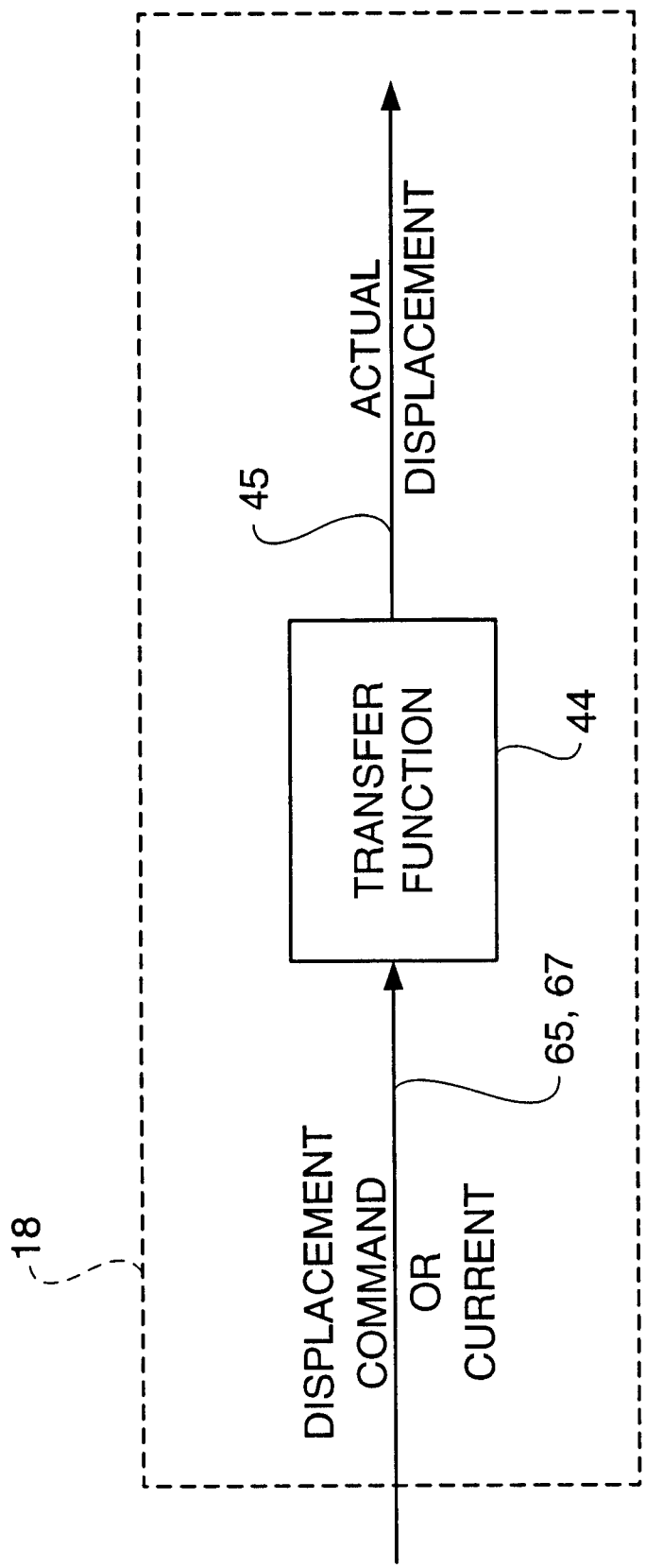
FIG. 2 is a schematic diagram of a method of determining actual hydrostatic displacement using a transfer function.

Referring now to FIG. 2, the current supplied to the first actuator 61 and second actuator 62 is proportional to the displacement of the variable displacement pump 48, the current command level, or displacement command, may be used to determine the actual displacement of the variable displacement pump 48. In order to determine an accurate estimate of the actual displacement (steady state or transiently) from the displacement command, the displacement command or current command level from the lines 65, 67 is passed through a transfer function 44 within the controller to 18. The transfer function 44 is the known system response of the displacement controller 60 to the displacement commands. The transfer function 44 is empirically determined by comparing the displacement command to a measured actual displacement of the variable displacement hydraulic pump 48. The accurate estimate of actual displacement is then output via line 45 for use within the controller 18. Alternately, a position sensor, such as a LVDT 40, may be used to sense the position of the feedback arm 64 and return a position signal to the controller 18 (see FIG. 1). The position signal from the LVDT 40 is indicative of the actual displacement of the variable displacement pump 48.

Figure 3:
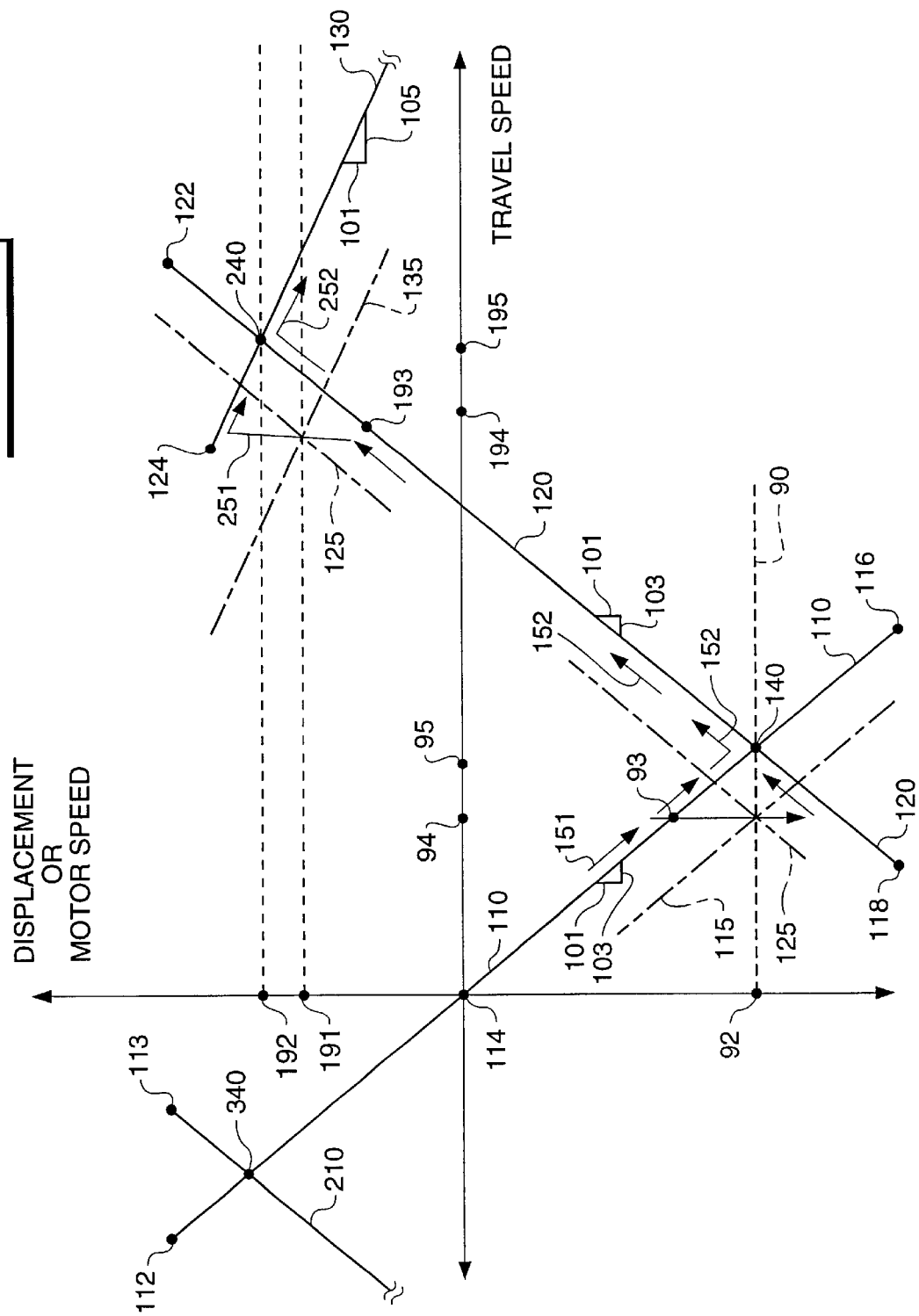
FIG. 3A is a graph which illustrates the relationship between actual displacement and motor speed to travel speed operating under positive loads.
FIG. 3B is a graph which illustrates the relationship between actual displacement and motor speed to travel speed when operating under negative loads.
Figure 3B:
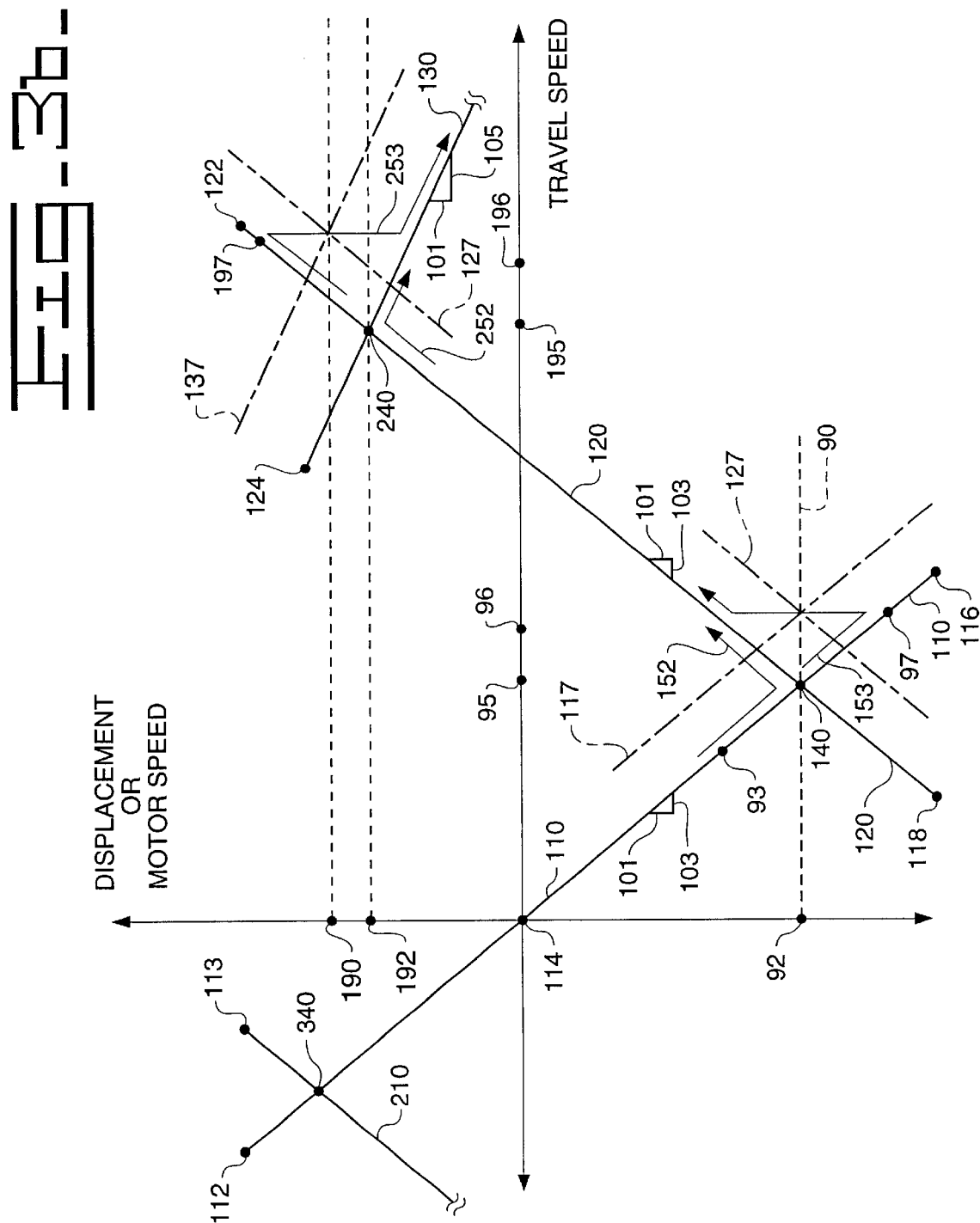

Referring now to FIGS. 1, 3A, and 3B, the mechanical transmission 16 includes a summing planetary gear arrangement 30, having a first planetary gear set 31, a second planetary gear set 32, and a third planetary gear set 33 which selectively combines the output from the continuously variable hydrostatic transmission 14 with the output of the engine 12 to drive the output shaft 26.

To place the mechanical transmission 16 in a first gear range 110, a clutch 102 and a clutch 104 are engaged. In the first gear range 110, the transmission provides a continuously variable travel speed between a point 112, where the displacement of the variable displacement pump 48 is near the maximum positive displacement, and a point 116, where the displacement of the variable displacement pump 48 is near the maximum negative displacement. It should be appreciated that operation in the first gear range 110 moves the work machine in a reverse direction between the points 112 and 114 and a forward direction between the points 114 and 116.

To place the mechanical transmission 16 in a second gear range 120, a clutch 108 and the clutch 104 are engaged. In the second gear range 120, the transmission assembly 10 provides a continuously variable travel speed between the point 118, where the displacement of the variable displacement pump 48 is near the maximum negative displacement, and a point 122, where the displacement of the variable displacement pump 48 is near the maximum positive displacement.

To place the mechanical transmission 16 in a third gear range 130, the clutch 108 and a clutch 106 are engaged. In the third gear range 130, the transmission assembly 10 provides a continuously variable travel speed between the point 124, where the displacement of the variable displacement pump 48 is near the maximum positive displacement, and a maximum negative displacement point (not shown).

To place the mechanical transmission 16 in a second reverse gear range 210, a clutch 109 and the clutch 104 are engaged. In the second reverse gear range 210, the transmission assembly 10 provides a continuously variable travel speed between the point 113, where the displacement of the variable displacement pump 48 is near the maximum positive displacement, and a maximum negative displacement point (not shown). It should also be appreciated that a third reverse gear range (not shown) can be selected by engaging the clutch 109 and the clutch 106.

Referring again to FIG. 1, the transmission assembly 10 further includes a transmission input speed sensor 76 operative to sense the speed of the pump input shaft 46 and direct a transmission input speed signal representative of the transmission input speed or engine speed to the controller 18. The transmission assembly 10 yet further includes a motor speed sensor 78 operative to sense the speed of the motor output shaft 34 and direct a motor speed signal representative of the motor output speed to the controller 18.

The motor speed signal combined with the transmission input speed signal can also be used to determine a transmission output speed and a machine travel speed if the engagement state of the clutches 102, 104, 106, 108, and 109 are known.

The transmission assembly 10 further includes a transmission output speed sensor 80 operative to sense the transmission output speed and direct a transmission output speed signal to the controller 18. Either of the motor speed sensor 78 combined with the input speed sensor 76 or the transmission output speed sensor 80 can be used to calculate the transmission output speed or the machine travel speed. However, in the present invention, the motor speed sensor 78 is used to precisely control the displacement of the pump 48 and therefore has a much higher resolution and lower dropout than the transmission output speed sensor 80. Thus, it is preferable to use the motor speed sensor 78 and the engagement state of the clutches 102, 104, 106, 108, and 109 to determine the transmission output speed and the machine travel speed. However, it is still possible and practical to use the output speed sensor 80 to determine machine travel speed. In addition, a transmission ratio, or the ratio of the speed of the output shaft 26 to the speed of the engine 12 may be derived from the transmission output speed signal and the transmission input speed signal.

The command input arrangement 22 receives operator inputs and transmits desired velocity and directional signals to the controller 18. The controller 18 includes RAM and ROM (not shown) that store transmission control software. The controller reads the desired velocity, directional signals, and speed signals, and transmits clutch control signals to control the engagement of the clutches 102, 104, 106, 108, 109 to engage the appropriate gear range as described above. In addition, the controller 18 generates the displacement command which control the displacement of the pump 48, and thus, the speed of the output shaft 34 of the motor 52.

Referring now to FIG. 4, there is shown the redetermined relationship between net volumetric efficiency $\eta_{vol,net}$ and the actual displacement 90, or current shift level required for a shift from the first gear range 110 to the second gear range 120. The net volumetric efficiency $\eta_{vol,net}$ is the combined volumetric efficiencies of the pump 48 and the motor 52. Net volumetric efficiency can be calculated using the following relationship between the speed of the variable displacement pump 48 and the speed of the motor 52:

$$N_{motor} = N_{pump} \cdot \frac{D_{pump}}{D_{motor}} \cdot \eta_{vol,net}$$

where $N_{motor}$ is the speed of the hydraulic motor 52 (determined from the output speed from the sensor 78), $N_{pump}$ is the speed of the hydraulic pump 48 (determined from the input speed signal from the sensor 76), $D_{motor}$ is a fixed displacement of the motor 52, and $D_{pump}$ is the displacement of the pump 48 which is determined either from the transfer function 44 or the position signal from the LVDT 40 (as described above). Solving for the net volumetric efficiency $\eta_{vol,net}$ we have:

$$\eta_{vol,net} = \frac{N_{motor} \cdot D_{motor}}{N_{pump} \cdot D_{pump}}$$

Using the net volumetric efficiency $\eta_{vol,net}$ it is possible to calculate a pressure change in the conduits 54, 56 in the hydrostatic transmission 14 for each shift between a pair of gear ranges. With the known pressure relationship change and known configuration of each gear range, one can estimate the $\eta_{vol,net}$ after the shift. During a shift, the motor speed $N_{motor}$ will almost instantaneously change to a new value due to the volumetric efficiency changing due to the shift, whereas the displacement of the Pump $D_{pump}$ is limited by system response of the displacement to the displacement commands. Thus, it is desirable to shift at a travel speed where the displacement of the pump $D_{pump}$ is the same before and after the shift. Thus, the displacement command for the shift point can be determined for each shift as a function of net volumetric efficiency $\eta_{vol,net}$ prior to executing the shift while the travel speed remains constant before and after the shift.

Referring again to FIG. 4, there is shown the relationship between net volumetric efficiency $\eta_{vol,net}$ for an upshift from the first gear range 110 to the second gear range 120. It should be appreciated that configuration of the mechanical transmission 16 in the first gear range 110 and the second gear range 120 have been specifically chosen such that the shift should always occur when the actual displacement reaches a constant displacement shift level independent of the net volumetric efficiency. The shift from the first gear range 110 to the second gear range 120 can be executed at a constant actual displacement because when operating in the first gear range 110, a change of displacement of a first value 101 causes a change in travel speed of a second value 103 just as when operating in the second gear range 120, a change of displacement of the first value 101 causes a change in travel speed of the second value 103.

Changes in net volumetric efficiency $\eta_{vol,net}$ do not effect the displacement shift level used to execute a shift from the first gear range 110 to the second gear range 120. Thus, the shift from the first gear range 110 to the second gear range 120 is executed when the actual displacement (derived from the transfer function 44) reaches the displacement shift level 92 under positive loads (net volumetric efficiency $\eta_{vol,net}$ less than 1.0), under no load (net is volumetric efficiency $\eta_{vol,net}$ equal to 1.0), and negative loads (net volumetric efficiency $\eta_{vol,net}$ greater than 0.1).

Referring again to FIG. 3A, there is shown several examples of a shift from the first gear range 110 to the second gear range 120. In a first example 151, the transmission assembly 10 is operating under a positive load. The shift is executed when the actual displacement 115 in the first gear range 110 reaches the displacement shift level 92. The actual displacement 115 reaches the displacement shift level 92 when the motor speed is at a point 93. Under positive loads, in the first gear range 110 before the shift, the motor 52 is operating as a motor and the net volumetric efficiency $\eta_{vol,net}$ reduces the travel speed for a given displacement. However, in the second gear range 120 after the shift, the motor 52 is operating as a pump and the net volumetric efficiency $\eta_{vol,net}$ requires a higher motor speed to achieve the same travel speed for a given displacement. Thus, shifting early (prior to the motor speed reaching a synchronous point 140) at the point 93 under positive loads allows the travel speed to remain constant at a speed 94 before and after the shift because the motor speed increases during the shift due to the net volumetric efficiency change. Note that the actual displacement 115 in the first gear range 110 is equal to the actual displacement 125 in the second gear 120 at the travel speed 94.

In a second example 152, the transmission assembly 10 is operating under zero load. The shift is executed when the actual displacement reaches the displacement shift level 92 when the motor speed reaches the synchronous point 140. Note that under zero load, the actual displacement matches the line 110. Under zero load, net volumetric efficiency $\eta_{vol,net}$ does not reduce the travel speed in the first gear range 110 and does not effect travel speed in the second gear range 120. Shifting at the synchronous point 140 under zero load allows the travel speed to remain constant at a speed 95 before and after the shift.

Referring now to FIG. 3B, in a third example 153, the transmission assembly 10 is operating under a negative load. The shift is executed when the actual displacement 117 reaches the displacement shift level 92 when the motor 52 is operating at the point 97. Under negative loads, in the first gear range 110 before the shift, the motor 52 is operating as a pump and the net volumetric efficiency $\eta_{vol,net}$ requires a higher motor speed to achieve the same travel speed for a given displacement. However, in the second gear range after the shift, the motor 52 is operating as a motor and the net volumetric efficiency $\eta_{vol,net}$ requires a lower motor speed to achieve the same travel speed for a given displacement. Thus, shifting late (after the motor speed reaches the synchronous point 140) at the point 97 under negative loads allows the travel speed remain constant at a travel speed 96 before and after the shift because the motor speed decreases during the shift due to the net volumetric efficiency change. Note that the actual displacement 117 in the first gear range 110 is equal to the actual displacement 127 in the second gear 120 at the travel speed 96.

Figure 5:
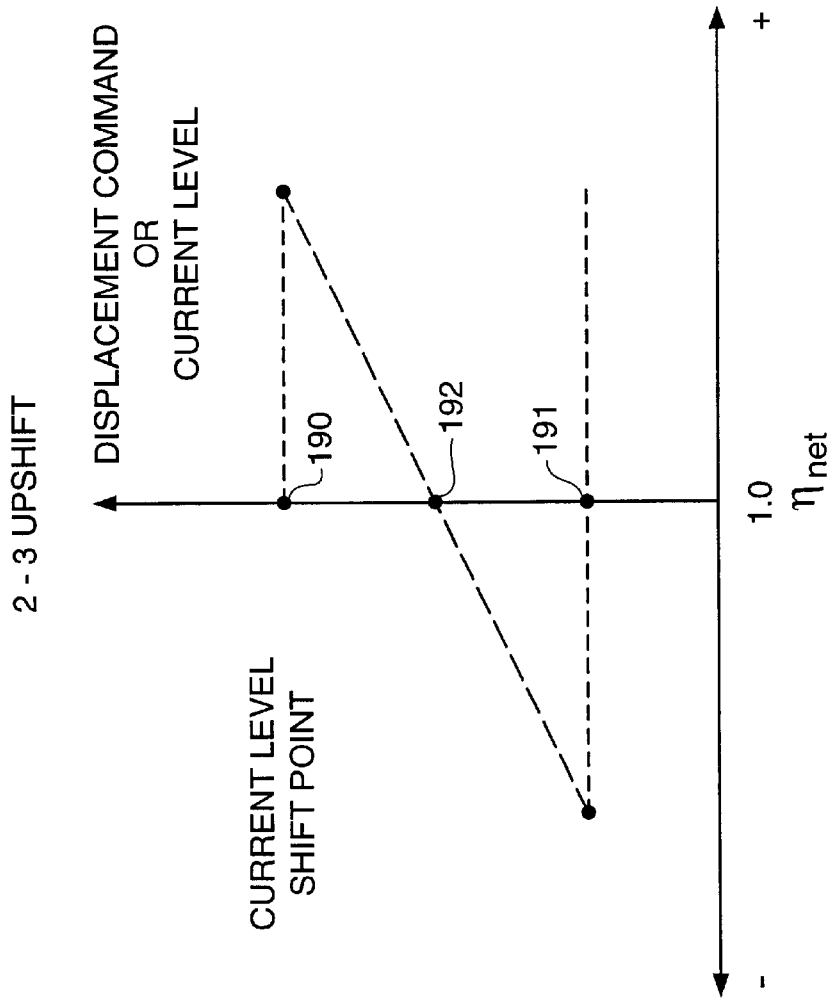
FIG. 5 is a graph illustrating the relationship between net volumetric efficiency of the hydrostatic transmission and actual displacement for a shift from the second gear range to a third gear range.

Referring now to FIG. 5, there is shown the relationship between net volumetric efficiency $\eta_{vol,net}$ for an upshift from the second gear range 120 to the third gear range 130. It should be appreciated that configuration of the mechanical transmission 16 in the second gear range 120 and the third gear range 130 has not been specifically chosen such that the shift should always occur when the actual displacement reaches a constant value. Unlike the relationship between the first gear range 110 and the second gear range 120, when operating in the third gear range 130, a change in travel speed of a value 105 is caused by changing the displacement the first value 101 whereas when operating in the second gear range 120, a change in travel speed of the value 103 is caused by changing the displacement by the first value 101 where the travel speed 105 is not equal to the travel speed 103. Thus, the shift from the second gear range 120 to the third gear range 130 cannot be executed at a constant actual displacement.

Changes in net volumetric efficiency ηhd vol,net(which is a function of output load) now effects the actual displacement shift level used to execute a shift from the second gear range 120 to the third gear range 130. Thus, shifts from the second gear range 120 to the third gear range 130 are executed when the actual displacement reaches a high displacement shift level 190 under negative loads, an intermediate displacement shift level 192 under no load, and a low displacement shift level 191 under positive loads. It should be appreciated that the displacement shift level may be varied anywhere within the range from the low level 191 to the high level 190.

Referring again to FIG. 3A, there is shown several examples of a shift from the second gear range 120 to the third gear range 130. In a first example 251, the transmission assembly 10 is operating under a positive load. The shift is executed when the actual displacement 125 reaches the displacement shift level 191 when the motor 52 is operating at a point 193. Under positive loads, in the second gear range 120 before the shift, the motor 52 is operating as a motor and the net volumetric efficiency $\eta_{vol,net}$ reduces the motor speed for a given displacement. However, in the third gear range 130 after the shift, the motor 52 is operating as a pump and the net volumetric efficiency $\eta_{vol,net}$ requires a higher motor speed to achieve the same travel speed for a given displacement. Thus, shifting early (prior to the motor speed reaching a synchronous point 240) at the point 193 under positive loads allows the travel speed to remain constant at a speed 194 before and after the shift because the motor speed increases during the shift due to the net volumetric efficiency change. Note that the actual displacement 125 in the second gear range 120 is equal to the actual displacement 135 in the third gear 130 at the speed 194.

In a second example 252 the transmission assembly 10 is operating under zero load. The shift is executed when the actual displacement reaches the displacement shift level 192 when the motor speed reaches the synchronous point 240. Note that under zero load, the actual displacement matches the line 120. Under zero load, net volumetric efficiency $\eta_{vol,net}$ does not reduce the travel speed in the second gear range 120 and does not effect travel speed in the third gear range 130. Shifting at the synchronous point 240 under zero load allows the travel speed remain constant at a speed 195 before and after the shift.

Referring again to FIG. 3B, in a third example 253, the transmission assembly 10 is operating under a negative load. The shift is executed when an actual displacement 127 reaches the displacement shift level 190 when the motor speed reaches a point 197. Under negative loads, in the second gear range 120 before the shift, the motor 52 is operating as a pump and the net volumetric efficiency $\eta_{vol,net}$ requires a higher motor speed to achieve the same travel speed for a given displacement. However, in the third gear range after the shift, the motor 52 is operating as a motor and the net volumetric efficiency $\eta_{vol,net}$ requires a lower motor speed to achieve the same travel speed for a given displacement. Thus, shifting late (after the motor speed reaches the synchronous point 240) at the point 197 under negative loads allows the travel speed to remain constant at a speed 196 before and after the shift because the motor speed decreases during the shift due to the net volumetric efficiency change. Note that the actual displacement 127 in the second gear range 120 is equal to the actual displacement 137 in the third gear 130 at the travel speed 196.

It should be appreciated, that a downshift from the second gear range 120 to the first gear range 110 could be executed when the actual displacement reached the constant displacement shift level 92, whereas a downshift from the third gear range 130 to the second gear range 120 would require that the relationship between net volumetric efficiency $\eta_{vol,net}$ be determined. Thus, when performing a downshift from the third gear range 130 to the second gear range 120, the net volumetric efficiency is first determined and then the actual displacement shift level is determined based on net volumetric efficiency $\eta_{vol,net}$.

Industrial Applicability

In operation, the controller 18 can adaptively execute shifts from a first gear range to a second gear range based only on the actual displacement which controls the displacement of the variable displacement hydraulic pump 48 of the hydrostatic transmission 14. The controller 18 determines the actual displacement of the variable displacement hydraulic pump 48 either by using a transfer function 44 (shown in FIG. 2) or by direct is measurement with the LVDT 40.

Once the actual displacement is known, the controller 18 calculates a net volumetric efficiency $\eta_{vol,net}$ of the hydrostatic transmission 14 using the actual displacement, the input speed to the pump 48, and the output speed of the motor 52. Once the net volumetric efficiency $\eta_{vol,net}$ has been calculated it is possible to use a known relationship between a net volumetric efficiency $\eta_{vol,net}$ and actual displacement to execute a shift (see FIGS. 4 and 5). The displacement shift level is determined such that the travel speed remains constant before and after the shift regardless of the load on the transmission assembly 10. It should be appreciated that the mechanical transmission 16 can be advantageously configured such that a shift from a first gear range 110 to a second gear range 120 will occur at a constant actual displacement regardless of load (see FIG. 4). Such a configuration greatly simplifies the calculations that the controller 18 must execute in order to determine a displacement shift level.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

Other aspects, objects and advantages of this invention can be obtained from a study of the drawings, the disclosure and the appended claims.

What is claimed is:

1. A transmission assembly driven by an engine, comprising:
    a hydrostatic transmission having a variable displacement hydraulic pump and a hydraulic motor;
    a mechanical transmission coupled to the hydrostatic transmission for selecting a first gear range and a second gear range; and
    a controller for receiving operator inputs and generating a displacement command operable to control a displacement of the variable displacement pump, wherein:
        the controller determines an actual displacement,
        the controller determines a displacement shift level, and
        the controller executes a shift from the first gear range to the second gear range when the actual displacement reaches the displacement shift level.

2. The transmission of claim 1, wherein:
    the actual displacement of the variable displacement hydraulic pump is estimated from the displacement command and a known system response of the variable displacement hydraulic pump, and
    the controller determines the displacement shift level from the estimated displacement.

3. The transmission assembly of claim 2, the hydrostatic transmission further having a servomechanism which controls the displacement of the variable displacement hydraulic pump, wherein:
    an electric current supplied to the servomechanism is proportional to the displacement of the variable displacement hydraulic pump, and
    the electric current is the displacement command.

4. The transmission assembly of claim 3, wherein the mechanical transmission is configured such that displacement shift level occurs at a constant electric current regardless of the load on the transmission.

5. The transmission assembly of claim 4, the mechanical transmission further having an output shaft driven at a travel speed, wherein:
    the mechanical transmission is configured such that (i) a change in the actual displacement by a first value in the first gear range produces a change in travel speed of a second value, and (ii) a change in the displacement by the first value in the second gear range produces a change in travel speed of the second value.

6. The transmission assembly of claim 2, further comprising:
    an input speed sensor which measures a speed representative of the speed of the variable displacement hydraulic pump and generates an input speed signal in response thereto,
    an output speed sensor which measures a speed representative of the speed of the hydraulic motor and generates an output speed signal in response thereto, wherein:
        a net volumetric efficiency is determined from the input speed signal and the output speed signal, and
        the displacement shift level is determined from (i) the net volumetric efficiency of the hydrostatic transmission, and (ii) a configuration of the mechanical transmission.

7. The transmission of claim 6, further comprising a travel speed sensor which measures the output speed of the mechanical transmission, wherein the shift point is selected at a displacement which produces the same travel speed in the first gear range as it does in the second gear range.

8. The transmission of claim 1, further comprising:
    a displacement sensor which measures the actual displacement of the variable displacement pump and generates a displacement signal in response thereto, wherein:
        the controller determines the displacement shift level from the measured actual displacement.

9. The transmission of claim 8, wherein the displacement sensor is a LVDT.

10. The transmission assembly of claim 8, the hydrostatic transmission further having a servomechanism which controls the displacement of the variable displacement hydraulic pump, wherein:
    an electric current supplied to the servomechanism is proportional to the displacement of the variable displacement hydraulic pump, and
    the electric current is the displacement command.

11. The transmission assembly of claim 10, further comprising:
    an input speed sensor which measures a speed representative of the speed of the variable displacement hydraulic pump and generates an input speed signal in response thereto; and
    an output speed sensor which measures a speed representative of the speed of the hydraulic motor and generates an output speed signal in response thereto, wherein:
        a net volumetric efficiency is determined from the input speed signal and the output speed signal, and
        the displacement shift level is determined from (i) the net volumetric efficiency of the hydrostatic transmission, and (ii) a configuration of the mechanical transmission.

12. The transmission of claim 11, further comprising a travel speed sensor which measures the output speed of the mechanical transmission, wherein the shift point is selected at a displacement which produces the same travel speed in the first gear range as it does in the second gear range.

13. A method of operating a transmission having (i) a hydrostatic transmission with a variable displacement hydraulic pump and a hydraulic motor, (ii) a mechanical transmission coupled to the hydrostatic transmission for selecting a first gear range and a second gear range, and (iii) a controller for receiving operator inputs and generating a displacement command operable to control a displacement of the variable displacement pump, comprising the steps of:
    determining an actual displacement with the controller;

determining a displacement shift level from the actual displacement with the controller; and executing a shift from the first gear range to the second gear range at the shift level.

14. The method of claim 13, further comprising the steps of:

estimating the actual displacement of the variable displacement hydraulic pump from a known system response of the variable displacement hydraulic pump; and determining the displacement shift level from the displacement command and the estimated actual displacement.

15. The method of claim 14, the hydrostatic transmission further having a servomechanism which controls the displacement of the variable displacement hydraulic pump, further comprising the steps of:

supplying an electric current to the servomechanism which is proportional to the displacement of the variable displacement hydraulic pump; and using the electric current as the displacement command.

16. The method of claim 15, further comprising the step of configuring the mechanical transmission such that the displacement shift level occurs at a constant electric current, regardless of the load on the transmission.

17. The method of claim 14, further comprising the steps of:

measuring an input speed representative of the speed of the variable displacement hydraulic pump and generating an input speed signal in response thereto;

measuring an output speed representative of the speed of the hydraulic motor and generating an output speed signal in response thereto;

determining the net volumetric efficiency from the input speed signal and the output speed signal; and determining the displacement shift level from the net volumetric efficiency of the hydrostatic transmission.

18. The method of claim 17, further comprising the step of selecting the shift point at a displacement which produces the same travel speed in the first gear range as it does in the second gear range.

19. The method of claim 13, further comprising the steps of:

measuring the actual displacement of the variable displacement pump and generating a displacement signal in response thereto; and determining the displacement shift level from the displacement signal.

20. The method of claim 19, further comprising the step of:

measuring the output speed of the mechanical transmission; and selecting the displacement shift level at a displacement which produces the same travel speed in the first gear range as it does in the second gear range.

* * * * *